US009075774B2

(12) United States Patent
Saikou et al.

(10) Patent No.: US 9,075,774 B2
(45) Date of Patent: Jul. 7, 2015

(54) PERPLEXITY CALCULATION DEVICE

(75) Inventors: Masahiro Saikou, Tokyo (JP);
Kiyokazu Miki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 13/698,543

(22) PCT Filed: Apr. 20, 2011

(86) PCT No.: PCT/JP2011/002301
§ 371 (c)(1),
(2), (4) Date: Dec. 26, 2012

(87) PCT Pub. No.: WO2011/145272
PCT Pub. Date: Nov. 24, 2011

(65) Prior Publication Data
US 2013/0110501 A1    May 2, 2013

(30) Foreign Application Priority Data
May 20, 2010   (JP) .................................. 2010-116171

(51) Int. Cl.
*G06F 17/27*   (2006.01)
*G06F 17/21*   (2006.01)

(52) U.S. Cl.
CPC .............. *G06F 17/21* (2013.01); *G06F 17/277* (2013.01)

(58) Field of Classification Search
CPC ..... G06F 17/20; G06F 17/27; G06F 17/2705; G06F 17/2715; G06F 17/28; G06F 17/2827
USPC .......................................... 704/9, 1, 2, 5, 10
See application file for complete search history.

(56) References Cited

U.S. PATENT DOCUMENTS

| 6,418,431 | B1* | 7/2002 | Mahajan et al. | 1/1 |
| 7,243,071 | B1* | 7/2007 | Resnick et al. | 704/257 |
| 7,275,029 | B1* | 9/2007 | Gao et al. | 704/9 |
| 2002/0188446 | A1* | 12/2002 | Gao et al. | 704/240 |
| 2006/0212288 | A1* | 9/2006 | Sethy et al. | 704/10 |
| 2007/0061356 | A1* | 3/2007 | Zhang et al. | 707/102 |

(Continued)

FOREIGN PATENT DOCUMENTS

JP            7-104786  A        4/1995

OTHER PUBLICATIONS

Sadao Kurohashi, et al., "Nonlocal Language Modeling based on Context Co-occurrence Vectors", IPSJ SIG Notes, Sep. 22, 2000, pp. 77-83, vol. 2000, No. 86.

(Continued)

*Primary Examiner* — Qi Han
(74) *Attorney, Agent, or Firm* — Sughrue Mion, PLLC

(57) ABSTRACT

A perplexity calculation device 500 includes: a weight coefficient calculating part 501 for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and a perplexity calculating part 502 for calculating perplexity of the statistical language model to the text, based on the calculated weight coefficients and the degrees of ease of word appearance.

9 Claims, 9 Drawing Sheets

(56) References Cited

U.S. PATENT DOCUMENTS

2007/0118512 A1* 5/2007 Riley et al. .................. 707/3
2009/0216740 A1* 8/2009 Ramakrishnan et al. ......... 707/5

OTHER PUBLICATIONS

Hiroaki Nanjo, et al., "Language Model and Speaking Rate Adaptation for Spontaneous Presentation Speech Recognition", the Transactions of the Institute of Electronics, Information and Communication Engineers, Aug. 1, 2004, pp. 1581-1592, vol. J87-D-II, No. 8.

Shinsuke Mori, "Interpolation of Class-based Bigram Language Models", IPSJ SIG Notes, Mar. 22, 1997, pp. 27-31, vol. 97, No. 29.

Kenji Kita, "Language and Calculation—4 Statistical Language Model", University of Tokyo Press, Nov. 25, 1999, 8 pages.

Kiyohiro Shikano, et al., "Speech Recognition System", Ohmsha, May 15, 2001, pp. 59-61.

Bo-June (Paul) Hsu, et al., "Iterative Language Model Estimation: Efficient Data Structure & Algorithms", Proc. Interspeech, Sep. 22-26, 2008, pp. 841-844.

Masataka Miyazaki, et al., "Improvement of PLSA Language Models for Perplexity Reduction based on the World Wide tfidf Statistics" IPSJ SIG Technical Report, Apr. 15, 2011 pp. 1-5, Information Processing Society of Japan, Japan.

* cited by examiner

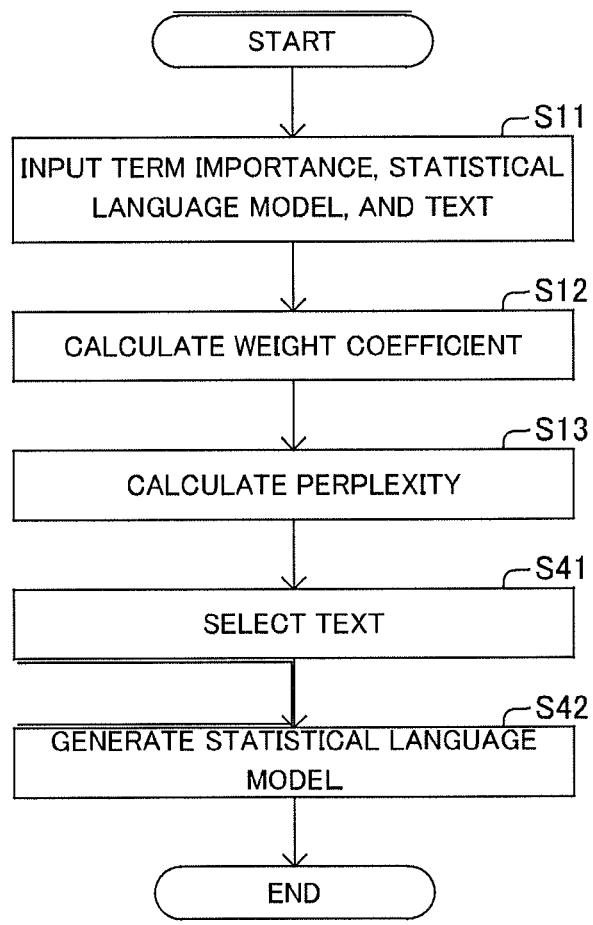

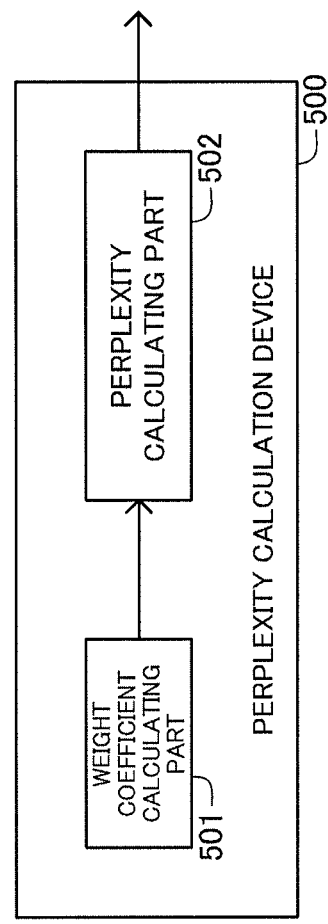

US 9,075,774 B2

PERPLEXITY CALCULATION DEVICE

CROSS REFERENCE TO RELATED APPLICATIONS

This application is a National Stage of International Application No. PCT/JP2011/002301, filed on Apr. 20, 2011, which claims priority from Japanese Patent Application No. 2010-116171, filed on May 20, 2010, the contents of all of which are incorporated herein by reference in their entirety.

TECHNICAL FIELD

The present invention relates to a perplexity calculation device configured to calculate the perplexity of a statistical language model to a text.

BACKGROUND ART

A statistical language model shows the probability of appearance of a word in a text (ease of appearance of a word in a text). A statistical language model is used in a variety of fields, such as speech recognition and machine translation (automatic translation). A technique for generating this statistic language model is described in, for example, Non-Patent Document 1.

As a technique for generating a statistic language model, there are a wide variety of techniques, such as a technique of classifying words included in a text in accordance with a predetermined criterion and estimating the ease of appearance of a word with higher accuracy based on the classified sets, and a technique of, when estimating the probability of appearance of a word, executing a smoothing process in a case that a highly reliable value cannot be obtained.

Further, it is possible to generate a plurality of statistical language models by combining these techniques. Therefore, a process of selecting or generating a statistical language model from the generated statistical language models is needed. Thus, a technique of evaluating a degree that a statistic language model shows a text based on an indicator called perplexity is known (e.g., Non-Patent Document 1).

Perplexity is an indicator based on the entropy of a language that can be obtained when a language is considered as an information source for generating words. Perplexity is equivalent to an average value of the number of words that can be generated in a certain location in a text.

For example, a perplexity calculation device using the technique described in Non-Patent Document 1 calculates the perplexity to a predetermined text based on an equation 1 and an equation 2 in the case of using a bigram model (Non-Patent Document, p. 58) as a statistical language model (Non-Patent Document 1, p. 37, etc.). In the equation 1 and the equation 2, $w_i$ denotes a word included in a text, $P(w_i|w_{i-1})$ denotes the probability of appearance of the word (ease of appearance of the word), $\log_2 P(w_i|w_{i-1})$ denotes a degree of ease of word appearance, N denotes the total number of words included in the text, and H denotes the entropy of a language obtained from the ease of appearance of the words included in the text.

$$PP = 2^H \quad \text{[Equation 1]}$$

$$H = -\frac{1}{N}\sum_{i=1}^{N} \log_2 P(w_i | w_{i-1}) \quad \text{[Equation 2]}$$

[Non-Patent Document 1] Kenji Kita, "Language and Calculation—4 Statistical Language Model," University of Tokyo Press, Nov. 25, 1999

However, the abovementioned perplexity calculation device calculates perplexity not based on word importance representing the degree of importance of a word but based on a degree of ease of word appearance based on the probability of appearance of a word (ease of appearance of a word).

Therefore, the abovementioned perplexity calculation device cannot calculate perplexity on which word importance is reflected. Thus, for example, there is a problem that it is impossible to, with respect to words having relatively higher word importance, appropriately evaluate a degree that a statistical language model shows a text. Moreover, for example, there is a problem that, in the case of selecting or generating a statistic language model based on the calculated perplexity, the processing accuracy of language processing using a statistical language model becomes low with respect to words having relatively high word importance.

SUMMARY

Accordingly, an object of the present invention is to provide a perplexity calculation device capable of solving the aforementioned problem, "it is impossible to calculate perplexity on which word importance is reflected."

In order to achieve the object, a perplexity calculation device as an exemplary embodiment of the present invention includes:

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and a perplexity calculating means for calculating perplexity of the statistical language model to the text, based on the calculated weight coefficients and the degrees of ease of word appearance.

Further, a perplexity calculation method as another exemplary embodiment of the present invention is a method including:

with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and calculating perplexity of the statistical language model to the text, based on the calculated weight coefficients and the degrees of ease of word appearance.

Further, a perplexity calculation program as another exemplary embodiment of the present invention is a program comprising instructions for causing an information processing device to realize:

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and a perplexity calculating means for calculating perplexity of the statistical language model to the text, based on the calculated weight coefficients and the degrees of ease of word appearance.

Further, a statistical language model selection device as another exemplary embodiment of the present invention includes:

a statistical language model storing means for storing a plurality of statistical language models each showing probabilities of appearance of words;

a weight coefficient calculating means for executing a process of, with respect to each of a plurality of text constituent words constituting a text, calculating a weight coefficient for correcting a degree of ease of word appearance having a value which becomes larger as a probability of appearance of the text constituent word becomes higher based on the statistical language models, based on word importance representing a degree of importance of the text constituent word, on each of the plurality of stored statistical language models;

a perplexity calculating means for, with respect to each of the plurality of stored statistical language models, calculating perplexity of the statistical language model to the text, based on the calculated weight coefficients and the degrees of ease of word appearance; and a statistical language model selecting means for selecting one statistical language model from among the plurality of stored statistical language models, based on the calculated perplexity.

Further, a statistical language model selection method as another exemplary embodiment of the present invention is a method including:

executing a process of, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word, on each of a plurality of statistical language models stored in a storage device;

with respect to each of the plurality of stored statistical language models, calculating perplexity of the statistical language model to the text, based on the calculated weight coefficients and the degrees of ease of word appearance; and selecting one statistical language model from among the plurality of stored statistical language models, based on the calculated perplexity.

Further, a statistical language model selection program as another exemplary embodiment of the present invention is a program including instructions for causing an information processing device to realize:

a weight coefficient calculating means for executing a process of with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word, on each of a plurality of statistical language models stored in a storage device;

a perplexity calculating means for, with respect to each of the plurality of stored statistical language models, calculating perplexity of the statistical language model to the text, based on the calculated weight coefficients and the degrees of ease of word appearance; and a statistical language model selecting means for selecting one statistical language model from among the plurality of stored statistical language models, based on the calculated perplexity.

Further, a statistical language model generation device as another exemplary embodiment of the present invention includes:

a statistical language model storing means for storing a plurality of statistical language models each showing probabilities of appearance of words;

a statistical language model mixing means for generating a statistical language model as a result of mixing at least two of the plurality of stored statistical language models;

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on the generated statistical language model, based on word importance representing a degree of importance of the text constituent word; and a perplexity calculating means for calculating perplexity of the generated statistical language model to the text, based on the calculated weight coefficients and the degrees of ease of word appearance.

The statistical language model mixing means is configured to, in a case that the calculated perplexity is larger than a preset threshold, regenerate a statistical language model.

Further, a statistical language model generation method as another exemplary embodiment of the present invention is a method including:

generating a statistical language model showing probabilities of appearance of words, the statistical language model being as a result of mixing at least two of a plurality of statistical language models stored in a storage device;

with respect to each of a plurality of text constituent words constituting a text, calculating a weight coefficient for correcting a degree of ease of word appearance having a value which becomes larger as a probability of appearance of the text constituent word becomes higher based on the generated statistical language model, based on word importance representing a degree of importance of the text constituent word;

calculating perplexity of the generated statistical language model to the text, based on the calculated weight coefficients and the degrees of ease of word appearance; and in a case that the calculated perplexity is larger than a preset threshold, regenerating a statistical language model.

Further, a statistical language model generation program as another exemplary embodiment of the present invention includes instructions for causing an information processing device to realize:

a statistical language model mixing means for generating a statistical language model showing probabilities of appearance of words, the statistical language model being as a result of mixing at least two of a plurality of statistical language models stored in a storage device;

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on the generated statistical language model, based on word importance representing a degree of importance of the text constituent word; and a perplexity calculating means for calculating perplexity of the generated statistical language model to the text, based on the calculated weight coefficients and the degrees of ease of word appearance.

The statistical language model mixing means is configured to, in a case that the calculated perplexity is larger than a preset threshold, regenerate a statistical language model.

Further, a statistical language model generation device as another exemplary embodiment of the present invention includes:

a statistical language model storing means for storing a statistical language model showing probabilities of appearance of words;

a weight coefficient calculating means for, with respect to each of a plurality of text constituent words constituting texts, calculating a weight coefficient for correcting a degree of ease of word appearance having a value which becomes larger as a probability of appearance of the text constituent word becomes higher based on the stored statistical language model, based on word importance representing a degree of importance of the text constituent word;

a perplexity calculating means for calculating perplexity of the stored statistical language model to the texts, based on the calculated weight coefficients and the degrees of ease of word appearance; and a statistical language model generating means for generating the statistical language model, based on the texts that the calculated perplexity is equal to or less than a preset threshold.

Further, a statistical language model generation method as another exemplary embodiment of the present invention is a method including:

with respect to each of a plurality of text constituent words constituting a text, calculating a weight coefficient for correcting a degree of ease of word appearance having a value which becomes larger as a probability of appearance of the text constituent word becomes higher based on a statistical language model which shows probabilities of appearance of words and which is stored in a storage device, based on word importance representing a degree of importance of the text constituent word;

calculating perplexity of the stored statistical language model to the text, based on the calculated weight coefficients and the degrees of ease of word appearance; and generating the statistical language model, based on the text that the calculated perplexity is equal to or less than a preset threshold.

Further, a statistical language model generation program as another exemplary embodiment of the present invention is a program including instructions for causing an information processing device to realize:

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on a statistical language model which shows probabilities of words and which is stored in a storage device, based on word importance representing a degree of importance of the text constituent word;

a perplexity calculating means for calculating perplexity of the stored statistical language model to the text, based on the calculated weight coefficients and the degrees of ease of word appearance; and a statistical language model generating means for generating the statistical language model, based on the text that the calculated perplexity is equal to or less than a preset threshold.

With the configurations described above, the present invention can calculate perplexity on which the degree of importance of a word is reflected.

BRIEF DESCRIPTION OF DRAWINGS

FIG. 8 is a flowchart showing the outline of an operation of the statistical language model generation device according to the fourth exemplary embodiment of the present invention; and FIG. 9 is a block diagram showing the outline of a function of a perplexity calculation device according to a fifth exemplary embodiment of the present invention.

EXEMPLARY EMBODIMENTS

Below, the respective exemplary embodiments of a perplexity calculation device, a perplexity calculation method, a perplexity calculation program, a statistical language model selection device, a statistical language model selection method, a statistical language model selection program, a statistical language model generation device, a statistical language model generation method, and a statistical language model generation program will be described with reference to FIGS. 1 to 9.

First Exemplary Embodiment

Configuration

Figure 1:
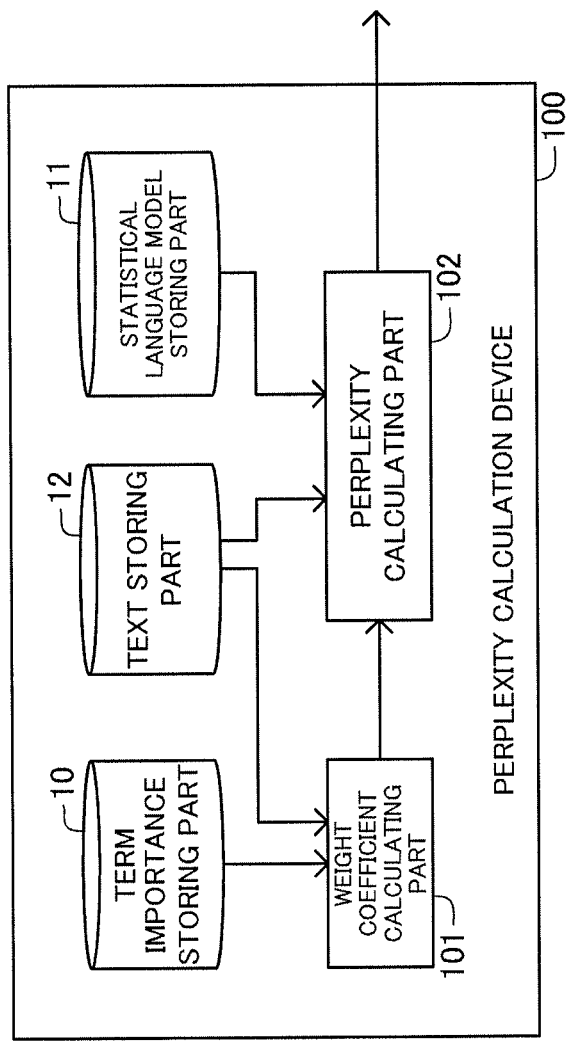
FIG. 1 is a block diagram showing the outline of a function of a perplexity calculation device according to a first exemplary embodiment of the present invention.

As shown in FIG. 1, a perplexity calculation device 100 according to a first exemplary embodiment is an information processing device. For example, the perplexity calculation device 100 can be a personal computer, a mobile phone terminal, a PHS (Personal Handyphone System), a PDA (Personal Data Assistance, Personal Digital Assistant), a car navigation terminal, a game terminal, or the like.

The perplexity calculation device 100 includes a central processing unit (CPU) and a storage device (a memory and a hard disk drive (HDD)), which are not shown in the drawings.

The perplexity calculation device 100 is configured to realize a function described later by CPU'S execution of a program stored in the storage device.

(Function)

FIG. 1 is a block diagram showing the function of the perplexity calculation device 100 configured as described above.

The function of the perplexity calculation device 100 includes a word importance storing part 10, a statistical language model storing part (a statistical language model storing means) 11, a text storing part 12, a weight coefficient calculating part (a weight coefficient calculating means) 101, and a perplexity calculating part (a perplexity calculating means) 102. The weight coefficient calculating part 101 and the perplexity calculating part 102 are realized by execution of the program by the CPU of the perplexity calculation device 100.

The word importance storing part 10 previously stores word importance representing the degrees of importance of words. In this exemplary embodiment, word importance has values that become larger as the degrees of words become higher. In this exemplary embodiment, word importance is a tf-idf (Term Frequency-Inverse Document Frequency) value.

Word importance may be a tf (Term Frequency) value, or an idf (Inverse Document Frequency) value. Moreover, word importance may be a value based on a score value representing the degree of importance of a word used at the time of generation of a statistic language model (e.g., an output value of a probability model outputting the likelihood of being important of a word).

The statistical language model storing part 11 previously stores a statistical language model showing the probability of appearance of a word (ease of appearance of a word). In this exemplary embodiment, the perplexity calculation device 100 uses an N-gram model as a statistical language model.

An N-gram model is a model constructed on the assumption that appearance (emergence) of an $N^{th}$ word depends on only N−1 pieces of words located immediately before the $N^{th}$ word in a text including a string of words (a plurality of words). An N-gram model is a model defining the probability of appearance of an $N^{th}$ word by conditional probability based on N−1 pieces of words located immediately before the $N^{th}$ word. In this exemplary embodiment, an explanation will be made by taking a bigram model of N=2 as an example among N-gram models.

The text storing part 12 previously stores a text including a string of words (a plurality of words). In this exemplary embodiment, the text storing part 12 previously stores a set of sentences including a plurality of words as a text.

The weight coefficient calculating part 101 calculates a weight coefficient with respect to each of the plurality of words (text constituent words) constituting the text stored by the text storing part 12. A weight coefficient is a coefficient for correcting a degree of ease of word appearance. A degree of ease of word appearance has a value which is based on the statistical language model and which becomes larger as the probability of appearance of a text constituent word becomes higher. Based on word importance with respect to a text constituent word stored by the word importance storing part 10, the weight coefficient calculating part 101 calculates a weight coefficient with respect to the text constituent word.

In this exemplary embodiment, the weight coefficient calculating part 101 calculates a value which becomes smaller as word importance becomes larger, as a weight coefficient. Moreover, in this exemplary embodiment, the weight coefficient calculating part 101 calculates a weight coefficient by using a function having a value which monotonically varies with respect to word importance.

To be specific, in this exemplary embodiment, the weight coefficient calculating part 101 calculates a weight coefficient based on an equation 3 using an exponential function. In the equation, x denotes word importance, and $k_i$ denotes a weight coefficient with respect to an $i^{th}$ word.

$$k_i = \exp(-x) \quad \text{[Equation 3]}$$

The weight coefficient calculating part 101 may be configured to calculate a weight coefficient by using a polynomial function, a power function, a sigmoid function, or the like. Moreover, the weight coefficient calculating part 101 may be configured to calculate a weight coefficient by using a function which has an upper limit value and a lower limit value and which monotonically varies.

The perplexity calculating part 102 calculates the perplexity (test-set perplexity) of the statistical language model stored by the statistical language model storing part 11 to the text stored by the text storing part 12, based on the weight coefficients calculated by the weight coefficient calculating part 101 and the degrees of ease of word appearance.

In this exemplary embodiment, the perplexity calculating part 102 calculates a value becoming smaller as the weight coefficients become smaller, as the perplexity. Moreover, in this exemplary embodiment, the perplexity calculating part 102 calculates the perplexity based on values as the result of multiplying the degrees of ease of word appearance by the weight coefficients.

To be specific, in this exemplary embodiment, the perplexity calculating part 102 calculates the perplexity based on an equation 4 and an equation 5. In the equation 4 and the equation 5, $w_i$ denotes a word included in a text, $P(w_i|w_{i-1})$ denotes the probability of appearance of the word (ease of appearance of the word), $\log_2 P(w_i|w_{i-1})$ denotes a degree of ease of word appearance, N denotes the total number of words included in the text, and H' denotes the entropy of a language obtained from the ease of appearance of the word included in the text.

$$PP = 2^{H'} \quad \text{[Equation 4]}$$

$$H' = -\frac{1}{N} \sum_{i=1}^{N} k_i \log_2 P(w_i | w_{i-1}) \quad \text{[Equation 5]}$$

(Operation)

Figure 2:
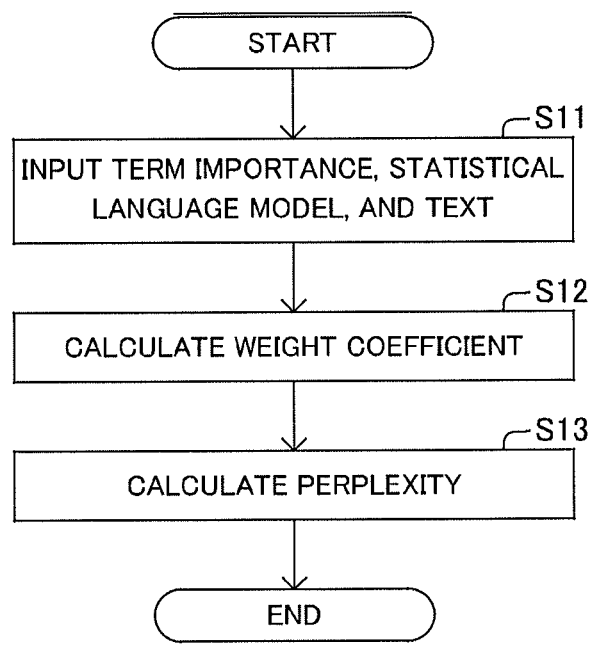
FIG. 2 is a flowchart showing the outline of an operation of the perplexity calculation device according to the first exemplary embodiment of the present invention.

Next, with reference to a flowchart shown in FIG. 2, an operation of the perplexity calculation device 100 will be described.

The perplexity calculation device 100 retrieves and inputs word importance, a statistical language model and a text stored by the storage device (step S11).

Next, the perplexity calculation device 100 calculates a weight coefficient with respect to each of a plurality of words constituting the inputted text (i.e., text constituent words) (step S12). For example, in a case that the word importance of a word "Tokyo" is 3.0, the perplexity calculation device 100 calculates $K_i(w_i) = \exp(-3.0) \approx 0.05$ as a weight coefficient with respect to the word "Tokyo."

The perplexity calculation device 100 then calculates a degree of ease of word appearance with respect to each of the text constituent words based on the inputted statistical language model. Moreover, the perplexity calculation device 100 calculates the perplexity of the statistical language model to the inputted text, based on the calculated weight coefficients and the calculated degrees of ease of word appearance (step S13).

As described above, according to the perplexity calculation device 100 of the first exemplary embodiment of the present invention, it is possible to calculate perplexity on which the degree of importance of a word is reflected. Consequently, for example, it is possible to appropriately evaluate a degree that a statistical language model shows a text with respect to words having relatively high word importance. Moreover, for example, in the case of selecting or generating a statistical language model based on the calculated perplexity, it is possible to prevent the processing accuracy of language processing using the statistical language model from decreasing with respect to words having relatively high word importance.

Second Exemplary Embodiment

Next, a statistical language model selection device according to a second exemplary embodiment of the present invention will be described. The statistical language model selection device according to the second exemplary embodiment differs from the perplexity calculation device according to the first exemplary embodiment by selecting a statistical language model based on calculated perplexity. Therefore, a description will be made below focusing on the different point.

(Configuration)

The statistical language model selection device is an information processing device having a similar configuration to that of the perplexity calculation device 100 according to the first exemplary embodiment.

(Function)

Figure 3:
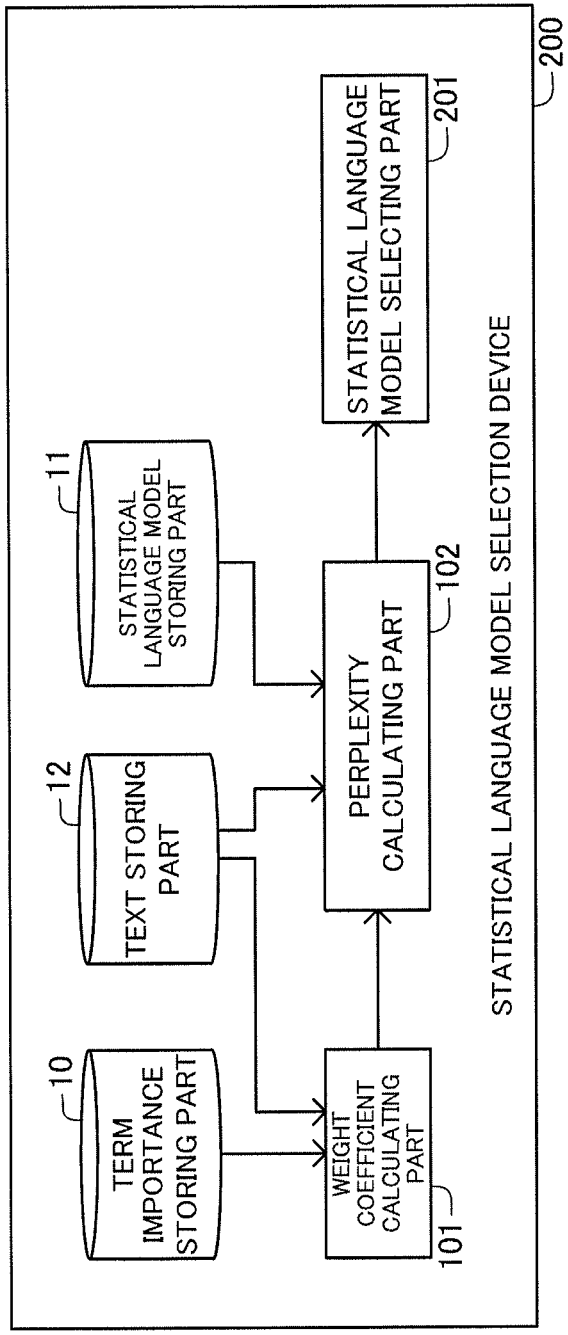
FIG. 3 is a block diagram showing the outline of a function of a statistical language model selection device according to a second exemplary embodiment of the present invention.

FIG. 3 is a block diagram showing the function of a statistical language model selection device 200.

The function of the statistical language model selection device 200 includes a statistical language model selecting part (a statistical language model selecting means) 201, in addition to the function of the perplexity calculation device 100 according to the first exemplary embodiment.

The statistical language model storing part 11 in the second exemplary embodiment previously stores a plurality of statistical language models.

The weight coefficient calculating part 101 in the second exemplary embodiment executes a process of calculating, with respect to each of a plurality of text constituent words, a weight coefficient for correcting a degree of ease of word appearance based on a statistical language model, based on the word importance stored by the word importance storing part 10, on each of the plurality of statistical language models stored by the statistical language model storing part 11.

The perplexity calculating part 102 in the second exemplary embodiment calculates, with respect to each of the plurality of statistical language models stored by the statistical language model storing part 11, the perplexity of the statistical language model to a text based on the weight coefficients calculated by the weight coefficient calculating part 101 and the degrees of ease of word appearance.

The statistical language model selecting part 201 selects one statistical language model from among the plurality of statistical language models stored by the statistical language model storing part 11, based on the perplexity calculated by the perplexity calculating part 102. In this exemplary embodiment, the statistical language model selecting part 201 selects a statistical language model having the smallest calculated perplexity.

(Operation)

Figure 4:
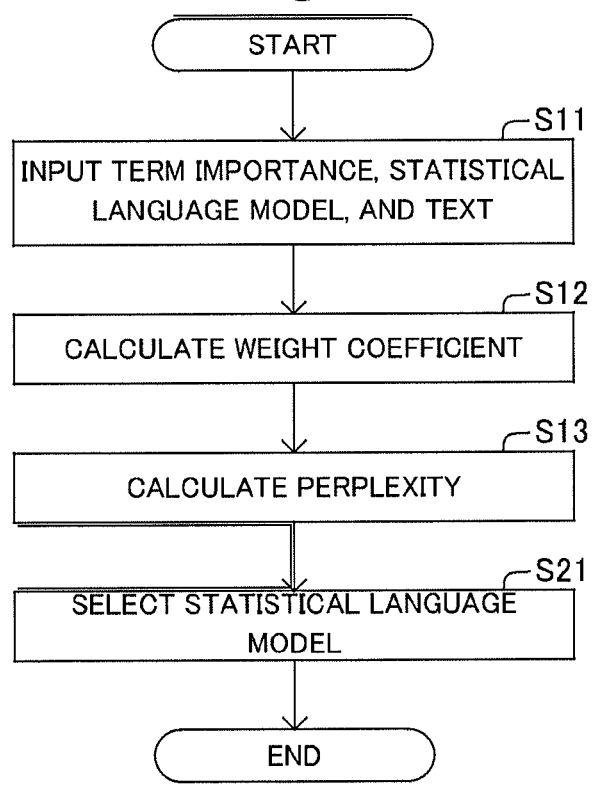
FIG. 4 is a flowchart showing the outline of an operation of the statistical language model selection device according to the second exemplary embodiment of the present invention.

Next, with reference to a flowchart shown in FIG. 4, an operation of the statistical language model selection device 200 will be described.

The statistical language model selection device 200 executes steps S11 to S13 as the perplexity calculation device 100 according to the first exemplary embodiment does, and thereby calculates perplexity with respect to each of the plurality of statistical language models stored by the statistical language model storing part 11.

Next, the statistical language model selection device 200 selects a statistical language model having the smallest calculated perplexity (step S21). The statistical language model selection device 200 then outputs information for specifying the selected statistical language model.

As described above, according to the statistical language model selection device 200 of the second exemplary embodiment of the present invention, it is possible to calculate perplexity on which the degree of importance of a word is reflected. Consequently, it is possible to appropriately evaluate a degree that a statistical language model shows a text, with respect to words having relatively high word importance. As a result, it is possible to select an appropriate statistical language model for words having relatively high word importance.

Third Exemplary Embodiment

Next, a statistical language model generation device according to a third exemplary embodiment of the present invention will be described. The statistical language model generation device according to the third exemplary embodiment differs from the statistical language model selection device according to the second exemplary embodiment by generating a statistical language model. Therefore, a description will be made below focusing on the different point.

(Configuration)

The statistical language model generation device is an information processing device having a similar configuration to that of the statistical language model selection device 200 according to the second exemplary embodiment.

(Function)

Figure 5:
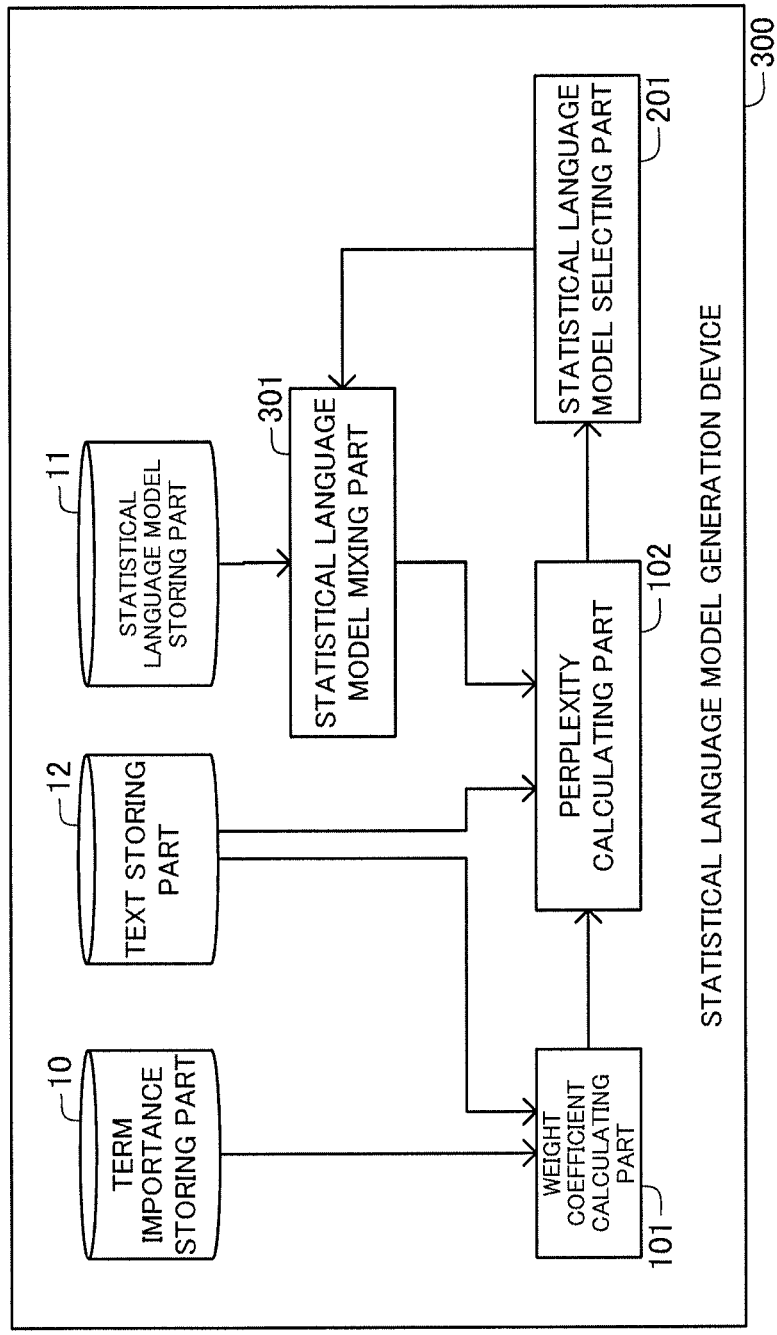
FIG. 5 is a block diagram showing the outline of a function of a statistical language model generation device according to a third exemplary embodiment of the present invention.

FIG. 5 is a block diagram showing the function of a statistical language model generation device 300.

The function of the statistical language model generation device 300 includes a statistical language model mixing part (a statistical language model mixing means) 301, in addition to the function of the statistical language model selection device 200 according to the second exemplary embodiment.

The statistical language model storing part 11 according to the third exemplary embodiment previously stores a plurality of statistical language models.

The statistical language model mixing part 301 generates a statistical language model as a result of mixing at least two of the plurality of statistical language models stored by the statistical language model storing part 11.

In this exemplary embodiment, the statistical language model mixing part 301 generates one statistical language model by linear interpolation of the probabilities of appearance of words shown by the respective statistical language models. As a technique for linear interpolation of probabilities, for example, a technique described in Non-Patent Document 2 and so on can be used.

[Non-Patent Document 2] kiyohiro Shikano, et al., "Speech Recognition System," Ohmsha, May 15, 2001, pp. 59-61

The statistical language model mixing part 301 may be configured to mix the statistical language models based on the perplexity calculated by the perplexity calculating part 102. As this technique, for example, a technique described in Non-Patent Document 3 and so on can be used.

[Non-Patent Document 3] Bo-June (Paul) Hsu, James Glass, "Iterative Language Model Estimation: Efficient Data Structure & Algorithms," Proc. Interspeech, Brisbane, Australia, September, 2008

The weight coefficient calculating part 101 in the third exemplary embodiment calculates, with respect to each of a plurality of text constituent words, a weight coefficient for correcting a degree of ease of word appearance based on the statistical language model generated by the statistical language model mixing part 301, based on word importance stored by the word importance storing part 10.

The perplexity calculating part 102 in the third exemplary embodiment calculates the perplexity of the statistical language model generated by the statistical language model mixing part 301 to a text, based on the weight coefficients calculated by the weight coefficient calculating part 101 and the degrees of ease of word appearance.

The statistical language model selecting part 201 in the third exemplary embodiment, in a case that the perplexity calculated by the perplexity calculating part 102 is larger than a preset threshold, causes the statistical language model mixing part 301 to regenerate a statistical language model. On the other hand, the statistical language model selecting part 201, in a case that the perplexity calculated by the perplexity calculating part 102 is equal to or less than the threshold, outputs information for specifying the statistical language model generated by the statistical language model mixing part 301.

(Operation)

Figure 6:
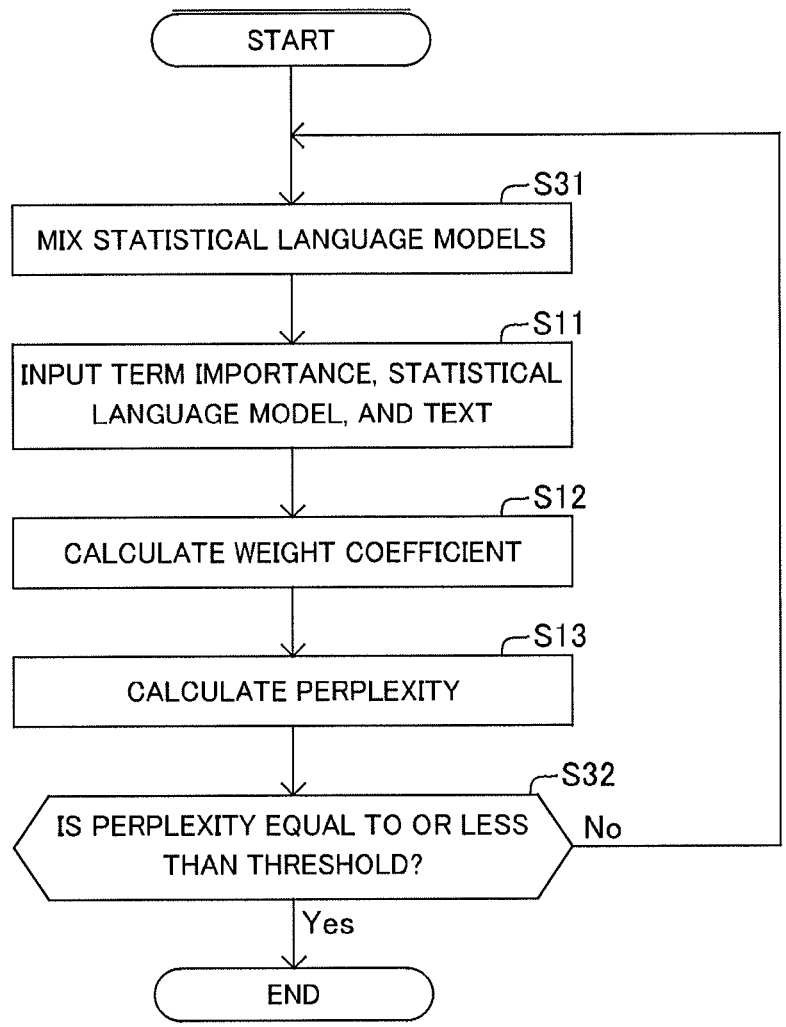
FIG. 6 is a flowchart showing the outline of an operation of the statistical language model generation device according to the third exemplary embodiment of the present invention.

Next, with reference to a flowchart shown in FIG. 6, an operation of the statistical language model generation device 300 will be described.

At first, the statistical language model generation device 300 generates a statistical language model as a result of mixing at least two of the stored statistical language models (step S31).

Next, the statistical language model generation device 300 executes steps S11 to S13 as the statistical language model selection device 200 according to the second exemplary embodiment does, thereby calculating the perplexity to the generated statistical language model.

The statistical language model generation device 300 then judges whether the calculated perplexity is equal to or less than a threshold (step S32).

In a case that the calculated perplexity is equal to or less than the threshold, the statistical language model generation device 300 outputs information for specifying the generated statistical language model.

On the other hand, in a case that the calculated perplexity is more than the threshold, the statistical language model generation device 300 returns to step S31 to repeat execution of the processes of steps S31 to S32, thereby generating a statistical language model.

As described above, according to the statistical language model generation device 300 of the third exemplary embodiment of the present invention, it is possible to calculate perplexity on which the degree of importance of a word is reflected. Consequently, it is possible to appropriately evaluate a degree that a statistical language model shows a text, with respect to words having relatively high word importance. As a result, it is possible to generate an appropriate statistical language model with respect to a word whose word importance is relatively high.

Fourth Exemplary Embodiment

Next, a statistical language model generation device according to a fourth exemplary embodiment of the present invention will be described. The statistical language model generation device according to the fourth exemplary embodiment differs from the perplexity calculation device according to the first exemplary embodiment by generating a statistical language model based on a text selected based on perplexity. Therefore, a description will be made below focusing on the different point.

(Configuration)

The statistical language model generation device is an information processing device having a similar configuration to that of the perplexity calculation device 100 according to the first exemplary embodiment.

(Function)

Figure 7:
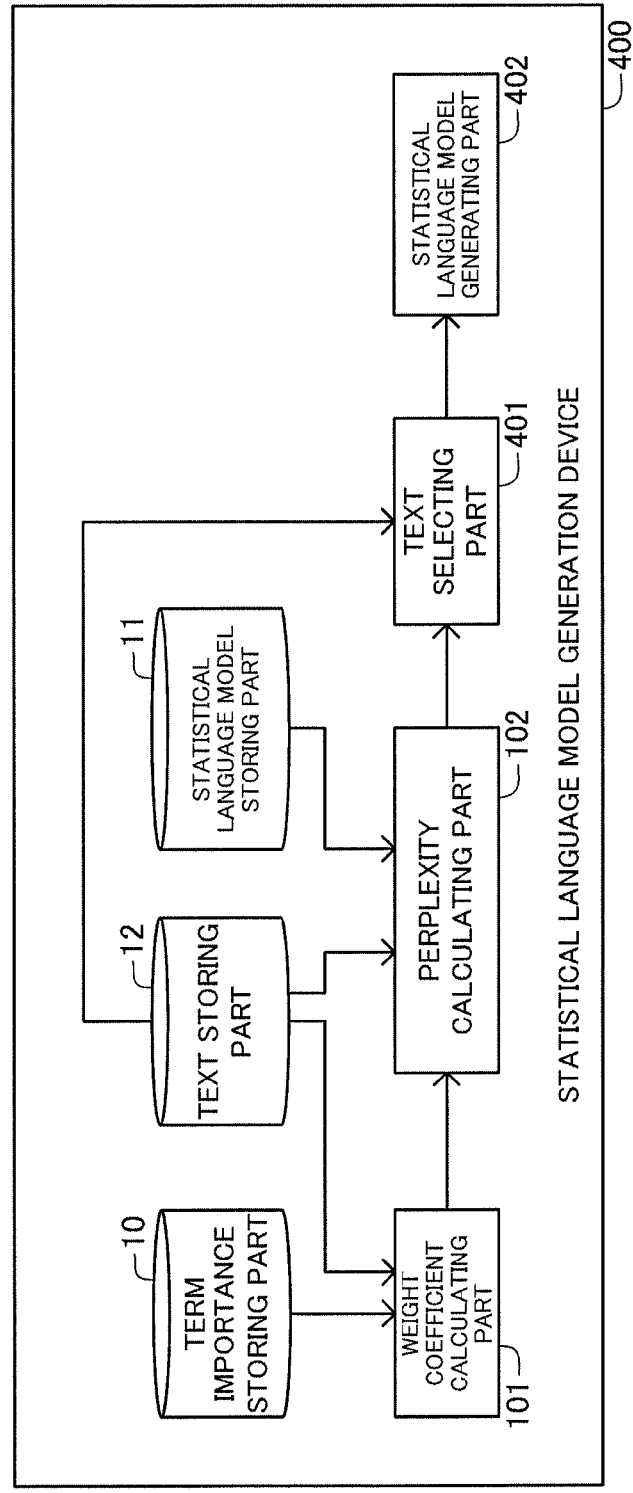
FIG. 7 is a block diagram showing the outline of a function of a statistical language model generation device according to a fourth exemplary embodiment of the present invention.

FIG. 7 is a block diagram showing the function of a statistical language model generation device 400.

The function of the statistical language model generation device 400 includes a text selecting part (part of a statistical language model generating means) 401 and a statistical language model generating part (part of the statistical language model generating means) 402, in addition to the function of the perplexity calculation device 100 according to the first exemplary embodiment.

The text storing part 12 in the fourth exemplary embodiment previously stores a plurality of texts.

The statistical language model storing part 11 in the fourth exemplary embodiment previously stores a statistical language model.

The weight coefficient calculating part 101 in the fourth exemplary embodiment executes a weight coefficient calculation process described below on each of the texts stored by the text storing part 12.

As the weight coefficient calculation process, the weight coefficient calculating part 101 executes a process of, with respect to each of a plurality of text constituent words constituting a processing target text, calculating a weight coefficient for correcting a degree of ease of word appearance based on the statistical language model stored by the statistical language model storing part 11, based on the word importance stored by the word importance storing part 10.

With respect to each of the texts stored by the text storing part 12, the perplexity calculating part 102 in the fourth exemplary embodiment calculates the perplexity of the statistical language model stored by the statistical language model storing part 11 to the text, based on the weight coefficients calculated by the weight coefficient calculating part 101 and the degrees of ease of word appearance.

The text selecting part 401 selects texts that the perplexity calculated by the perplexity calculating part 102 is equal to or less than a previously set threshold.

The statistical language model generating part 402 generates a statistical language model based on the texts selected by the text selecting part 401. For example, the statistical language model generating part 402 generates a statistical language model by using the technique described in Non-Patent Document 1.

(Operation)

Next, with reference to a flowchart shown in FIG. 8, an operation of the statistical language model generation device 400 will be described.

The statistical language model generation device 400 executes steps S11 to S13 as the perplexity calculation device 100 according to the first exemplary embodiment does, thereby calculating perplexity with respect to each of the plurality of texts stored by the text storing part 12.

Next, the statistical language model generation device 400 selects texts that the calculated perplexity is equal to or less than the threshold (step S41). The statistical language model generation device 400 generates a statistical language model based on the selected texts (step S42).

As described above, according to the statistical language model generation device 400 in the fourth exemplary embodiment of the present invention, it is possible to calculate perplexity on which the degree of importance of a word is reflected. Consequently, with respect to words having relatively high word importance, it is possible to appropriately evaluate a degree that a statistic language model shows texts. Therefore, it is possible to generate a statistical language model based on the appropriately selected texts. As a result, it is possible to generate an appropriate statistical language model with respect to words having relatively high word importance.

Fifth Exemplary Embodiment

Next, a perplexity calculation device 500 according to a fifth exemplary embodiment of the present invention will be described with reference to FIG. 9.

The perplexity calculation device 500 according to the fifth exemplary embodiment includes:

a weight coefficient calculating part (a weight coefficient calculating means) 501 for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and a perplexity calculating part (a perplexity calculating means) 502 for calculating perplexity of the statistical language model to the text, based on the calculated weight coefficients and the degrees of ease of word appearance.

According to this, it is possible to calculate perplexity on which the degree of importance of a word is reflected. Consequently, for example, with respect to words having relatively high word importance, it is possible to appropriately evaluate a degree that a statistical language model shows a text. Moreover, for example, in the case of selecting or generating a statistical language model based on the calculated perplexity, it is possible to prevent the processing accuracy of language processing using the statistical language model from decreasing with respect to words having relatively high word importance.

Although the present invention has been explained with reference to the exemplary embodiments described above, the present invention is not limited to the exemplary embodiments described above. The configuration and details of the present invention can be altered in various manners that can be understood by those skilled in the art within the scope of the present invention.

In the respective exemplary embodiment, the respective functions of the perplexity calculation device, the statistical language model selection device and the statistical language model generation device are realized by execution of a program (software) by the CPU, but may be realized by hardware such as a circuit.

Further, the program is stored in the storage device in the respective exemplary embodiments, but may be stored in a computer-readable recording medium. For example, the recording medium is a portable medium such as a flexible disk, an optical disk, a magneto-optical disk, a semiconductor memory.

Further, as another exemplary embodiment of the exemplary embodiments, any combination of exemplary embodiments and modification examples may be employed.

[Supplementary Notes]

The whole or part of the exemplary embodiments disclosed above can be described as, but not limited to, the following supplementary notes.

(Supplementary Note 1)

A perplexity calculation device, including:

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and a perplexity calculating means for calculating perplexity of the statistical language model to the text, based on the calculated weight coefficients and the degrees of ease of word appearance.

According to this, it is possible to calculate perplexity on which the degree of importance of a word is reflected. Consequently, for example, with respect to words having relatively high word importance, it is possible to appropriately evaluate a degree that a statistical language model shows a text. Moreover, for example, in the case of selecting or generating a statistical language model cased on calculated perplexity, it is possible to avoid that the processing accuracy of language processing using the statistical language model decreases with respect to words having relatively high word importance.

(Supplementary Note 2)

The perplexity calculation device according to Supplementary Note 1, wherein:

the weight coefficient calculating means is configured to calculate a value which becomes smaller as the word importance becomes larger, as the weight coefficient; and the perplexity calculating means is configured to calculate a value which becomes smaller as the weight coefficients become smaller, as the perplexity.

(Supplementary Note 3)

The perplexity calculation device according to Supplementary Note 2, wherein the perplexity calculating means is configured to calculate the perplexity, based on values as a result of multiplying the degrees of ease of word appearance by the weight coefficients.

(Supplementary Note 4)

The perplexity calculation device according to any of Supplementary Note 1 to 3, wherein the weight coefficient calculating means is configured to calculate the weight coefficient by using a function having a value which monotonically varies with respect to the word importance.

For example, as a function having a value which monotonically varies with respect to word importance, it is possible to use an exponential function, a polynomial function, a power function, a sigmoid function, or the like.

(Supplementary Note 5)

The perplexity calculation device according to any of Supplementary Notes 1 to 4, wherein the weight coefficient calculating means is configured to use, as the word importance, a value based on at least one of a tf (Term Frequency) value, an idf (Inverse Document Frequency) value, a tf-idf (Term Frequency-Inverse Document Frequency) value, and a score value which represents a degree of importance of a word used at the time of generation of the statistical language model.

(Supplementary Note 6)

A perplexity calculation method, including:

with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and calculating perplexity of the statistical language model to the text, based on the calculated weight coefficients and the degrees of ease of word appearance.

(Supplementary Note 7)

The perplexity calculation method according to Supplementary Note 6, comprising:

calculating a value which becomes smaller as the word importance becomes larger, as the weight coefficient; and calculating a value which becomes smaller as the weight coefficients become smaller, as the perplexity.

(Supplementary Note 8)

A perplexity calculation program, including instructions for causing an information processing device to realize:

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and a perplexity calculating means for calculating perplexity of the statistical language model to the text, based on the calculated weight coefficients and the degrees of ease of word appearance.

(Supplementary Note 9)

The perplexity calculation program according to Supplementary Note 8, wherein:

the weight coefficient calculating means is configured to calculate a value which becomes smaller as the word importance becomes larger, as the weight coefficient; and the perplexity calculating means is configured to calculate a value which becomes smaller as the weight coefficients become smaller, as the perplexity.

(Supplementary Note 10)

A statistical language model selection device, including:

a statistical language model storing means for storing a plurality of statistical language models each showing probabilities of appearance of words;

a weight coefficient calculating means for executing a process of with respect to each of a plurality of text constituent words constituting a text, calculating a weight coefficient for correcting a degree of ease of word appearance having a value which becomes larger as a probability of appearance of the text constituent word becomes higher based on the statistical language models, based on word importance representing a degree of importance of the text constituent word, on each of the plurality of stored statistical language models;

a perplexity calculating means for, with respect to each of the plurality of stored statistical language models, calculating perplexity of the statistical language model to the text, based on the calculated weight coefficients and the degrees of ease of word appearance; and a statistical language model selecting means for selecting one statistical language model from among the plurality of stored statistical language models, based on the calculated perplexity.

According to this, it is possible to calculate perplexity on which the degree of importance of a word is reflected. Consequently, with respect to words having relatively high word importance, it is possible to appropriately evaluate a degree that a statistical language model shows a text. As a result, it is possible to select an appropriate statistical language model with respect to words having relatively high word importance.

(Supplementary Note 11)

A statistical language model selection method, including:

executing a process of with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word, on each of a plurality of statistical language models stored in a storage device;

with respect to each of the plurality of stored statistical language models, calculating perplexity of the statistical language model to the text, based on the calculated weight coefficients and the degrees of ease of word appearance; and selecting one statistical language model from among the plurality of stored statistical language models, based on the calculated perplexity.

(Supplementary Note 12)

A statistical language model selection program, including instructions for causing an information processing device to realize:

a weight coefficient calculating means for executing a process of, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word, on each of a plurality of statistical language models stored in a storage device;

a perplexity calculating means for, with respect to each of the plurality of stored statistical language models, calculating perplexity of the statistical language model to the text, based on the calculated weight coefficients and the degrees of ease of word appearance; and a statistical language model selecting means for selecting one statistical language model from among the plurality of stored statistical language models, based on the calculated perplexity.

(Supplementary Note 13)

A statistical language model generation device, including:

a statistical language model storing means for storing a plurality of statistical language models each showing probabilities of appearance of words;

a statistical language model mixing means for generating a statistical language model as a result of mixing at least two of the plurality of stored statistical language models;

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on the generated statistical language model, based on word importance representing a degree of importance of the text constituent word; and a perplexity calculating means for calculating perplexity of the generated statistical language model to the text, based on the calculated weight coefficients and the degrees of ease of word appearance, wherein the statistical language model mixing means is configured to, in a case that the calculated perplexity is larger than a preset threshold, regenerate a statistical language model.

According to this, it is possible to calculate perplexity on which the degree of importance of a word is reflected. Consequently, with respect to words having relatively high word importance, it is possible to appropriately evaluate a degree that a statistical language model shows a text. As a result, it is possible to generate an appropriate statistical language model with respect to words having relatively high word importance.

(Supplementary Note 14)

A statistical language model generation method, including:

generating a statistical language model showing probabilities of appearance of words, the statistical language model being as a result of mixing at least two of a plurality of statistical language models stored in a storage device;

with respect to each of a plurality of text constituent words constituting a text, calculating a weight coefficient for correcting a degree of ease of word appearance having a value which becomes larger as a probability of appearance of the text constituent word becomes higher based on the generated statistical language model, based on word importance representing a degree of importance of the text constituent word;

calculating perplexity of the generated statistical language model to the text, based on the calculated weight coefficients and the degrees of ease of word appearance; and in a case that the calculated perplexity is larger than a preset threshold, regenerating a statistical language model.

(Supplementary Note 15)

A statistical language model generation program, including instructions for causing an information processing device to realize:

a statistical language model mixing means for generating a statistical language model showing probabilities of appearance of words, the statistical language model being as a result of mixing at least two of a plurality of statistical language models stored in a storage device;

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on the generated statistical language model, based on word importance representing a degree of importance of the text constituent word; and a perplexity calculating means for calculating perplexity of the generated statistical language model to the text, based on the calculated weight coefficients and the degrees of ease of word appearance, wherein the statistical language model mixing means is configured to, in a case that the calculated perplexity is larger than a preset threshold, regenerate a statistical language model.

(Supplementary Note 16)

A statistical language model generation device, including:

a statistical language model storing means for storing a statistical language model showing probabilities of appearance of words;

a weight coefficient calculating means for, with respect to each of a plurality of text constituent words constituting texts, calculating a weight coefficient for correcting a degree of ease of word appearance having a value which becomes larger as a probability of appearance of the text constituent word becomes higher based on the stored statistical language model, based on word importance representing a degree of importance of the text constituent word;

a perplexity calculating means for calculating perplexity of the stored statistical language model to the texts, based on the calculated weight coefficients and the degrees of ease of word appearance; and a statistical language model generating means for generating the statistical language model, based on the texts that the calculated perplexity is equal to or less than a preset threshold.

According to this, it is possible to calculate perplexity on which the degree of importance of a word is reflected. Consequently, with respect to words having relatively high word importance, it is possible to appropriately evaluate a degree that a statistical language model shows a text. Therefore, it is possible to generate a statistical language model based on an appropriately selected text. As a result, it is possible to generate an appropriate statistical language model with respect to words having relatively high word importance.

(Supplementary Note 17)

A statistical language model generation method, including:

with respect to each of a plurality of text constituent words constituting a text, calculating a weight coefficient for correcting a degree of ease of word appearance having a value which becomes larger as a probability of appearance of the text constituent word becomes higher based on a statistical language model which shows probabilities of appearance of words and which is stored in a storage device, based on word importance representing a degree of importance of the text constituent word;

calculating perplexity of the stored statistical language model to the text, based on the calculated weight coefficients and the degrees of ease of word appearance; and generating the statistical language model, based on the text that the calculated perplexity is equal to or less than a preset threshold.

(Supplementary Note 18)

A statistical language model generation program, including instructions for causing an information processing device to realize:

a weight coefficient calculating means for, with respect to each of a plurality of text constituent words constituting a text, calculating a weight coefficient for correcting a degree of ease of word appearance having a value which becomes larger as a probability of appearance of the text constituent word becomes higher based on a statistical language model which shows probabilities of words and which is stored in a storage device, based on word importance representing a degree of importance of the text constituent word;

a perplexity calculating means for calculating perplexity of the stored statistical language model to the text, based on the calculated weight coefficients and the degrees of ease of word appearance; and a statistical language model generating means for generating the statistical language model, based on the text that the calculated perplexity is equal to or less than a preset threshold.

The present invention is based upon and claims the benefit of priority from Japanese patent application No. 2010-116171, filed on May 20, 2010, the disclosure of which is incorporated herein in its entirety by reference.

INDUSTRIAL APPLICABILITY

The present invention can be applied to an information processing device using a statistical language model such as speech recognition and mechanical translation (automatic translation), and the like.

DESCRIPTION OF REFERENCE NUMERALS 10 word importance storing part
11 statistical language model storing part
100 text storing part
100 perplexity calculation device
101 weight coefficient calculating part
102 perplexity calculating part
200 statistical language model selection device
201 statistical language model selecting part
300 statistical language model generation device
301 statistical language model mixing part
400 statistical language model generation device
401 text selecting part
402 statistical language model generating part
500 perplexity calculation device
501 weight coefficient calculating part
502 perplexity generating part

The invention claimed is:

1. A perplexity calculation device, comprising:
a hardware processor;
a weight coefficient calculating unit, implemented on the hardware processor, for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and
a perplexity calculating unit, implemented on the hardware processor, for calculating perplexity of the statistical language model to the text, based on the calculated weight coefficients and the degrees of ease of word appearance.

2. The perplexity calculation device according to claim 1, wherein:
the weight coefficient calculating unit is configured to calculate a value which becomes smaller as the word importance becomes larger, as the weight coefficient; and
the perplexity calculating unit is configured to calculate a value which becomes smaller as the weight coefficients become smaller, as the perplexity.

3. The perplexity calculation device according to claim 2, wherein the perplexity calculating unit is configured to calculate the perplexity, based on values as a result of multiplying the degrees of ease of word appearance by the weight coefficients.

4. The perplexity calculation device according to claim 1, wherein the weight coefficient calculating unit is configured to calculate the weight coefficient by using a function having a value which monotonically varies with respect to the word importance.

5. The perplexity calculation device according to claim 1, wherein the weight coefficient calculating unit is configured to use, as the word importance, a value based on at least one of a tf (Term Frequency) value, an idf (Inverse Document Frequency) value, a tf-idf (Term Frequency-Inverse Document Frequency) value, and a score value which represents a degree of importance of a word used at the time of generation of the statistical language model.

6. A perplexity calculation method performed by a hardware processor, comprising:
with respect to each of a plurality of text constituent words constituting a text, calculating, by the hardware processor, a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and
calculating, by the hardware processor, perplexity of the statistical language model to the text, based on the calculated weight coefficients and the degrees of ease of word appearance.

7. The perplexity calculation method according to claim 6, comprising:
calculating a value which becomes smaller as the word importance becomes larger, as the weight coefficient; and
calculating a value which becomes smaller as the weight coefficient becomes smaller, as the perplexity.

8. A non-transitory computer-readable medium storing a perplexity calculation program, the program comprising instructions for causing an information processing device to realize:
a weight coefficient calculating unit for, with respect to each of a plurality of text constituent words constituting a text, calculating a weight coefficient for correcting a degree of ease of word appearance having a value which becomes larger as a probability of appearance of the text constituent word becomes higher based on a statistical language model showing probabilities of appearance of words, based on word importance representing a degree of importance of the text constituent word; and
a perplexity calculating unit for calculating perplexity of the statistical language model to the text, based on the calculated weight coefficients and the degrees of ease of word appearance.

9. The computer-readable medium storing the perplexity calculation program according to claim 8, wherein:
the weight coefficient calculating unit is configured to calculate a value which becomes smaller as the word importance becomes larger, as the weight coefficient; and
the perplexity calculating unit is configured to calculate a value which becomes smaller as the weight coefficient becomes smaller, as the perplexity.

* * * * *